(12) United States Patent
Smetz

(10) Patent No.: US 6,994,501 B2
(45) Date of Patent: Feb. 7, 2006

(54) STOPPING POINT

(75) Inventor: Reinhard Smetz, Baldingen (DE)

(73) Assignee: RUD-Kettenfabrik Rieger & Dietz GmbH u. Co., Aalen-Unterkochen (DE)

( * ) Notice: Subject to any disclaimer, the term of this patent is extended or adjusted under 35 U.S.C. 154(b) by 0 days.

(21) Appl. No.: 10/499,158

(22) PCT Filed: Dec. 18, 2002

(86) PCT No.: PCT/DE02/04690

§ 371 (c)(1),
(2), (4) Date: Jun. 16, 2004

(87) PCT Pub. No.: WO03/056207

PCT Pub. Date: Jul. 10, 2003

(65) Prior Publication Data

US 2005/0019135 A1    Jan. 27, 2005

(30) Foreign Application Priority Data

Dec. 21, 2001 (DE) ................................ 101 64 593

(51) Int. Cl.
*F16B 23/00* (2006.01)
(52) U.S. Cl. ...................... 411/400; 411/410
(58) Field of Classification Search ............... 411/400, 411/410
See application file for complete search history.

(56) References Cited

U.S. PATENT DOCUMENTS

| | | | | |
|---|---|---|---|---|
| 1,642,958 A | * | 9/1927 | Joyner | 59/95 |
| 1,867,574 A | * | 7/1932 | Lekan | 294/82.1 |
| 2,519,460 A | * | 8/1950 | Hansen | 59/95 |
| 2,544,655 A | * | 3/1951 | Chase | 59/35.1 |
| 2,651,533 A | * | 9/1953 | Miller | 403/164 |
| 2,672,230 A | * | 3/1954 | Jetzke | 198/682 |
| 2,748,646 A | * | 6/1956 | Harold et al. | 411/389 |
| 2,812,971 A | * | 11/1957 | Teutsch | 294/82.1 |
| 3,297,293 A | * | 1/1967 | Andrews et al. | 248/499 |
| 3,492,033 A | * | 1/1970 | Mueller | 403/78 |
| 3,905,633 A | * | 9/1975 | Larson | 294/1.1 |
| 4,295,765 A | * | 10/1981 | Burke | 410/101 |
| 4,431,352 A | * | 2/1984 | Andrews | 410/101 |
| 4,473,984 A | * | 10/1984 | Lopez | 52/410 |
| 4,570,987 A | * | 2/1986 | Wong et al. | 294/1.1 |
| 4,641,986 A | * | 2/1987 | Tsui et al. | 403/164 |
| 4,699,410 A | * | 10/1987 | Seidel | 294/1.1 |

(Continued)

FOREIGN PATENT DOCUMENTS

DE            138876        6/1902

(Continued)

OTHER PUBLICATIONS http://www.usmotors.com/service/faq14.htm.*

(Continued)

*Primary Examiner*—Robert J. Sandy
*Assistant Examiner*—Jeffrey A Sharp
(74) *Attorney, Agent, or Firm*—Mark P. Stone

(57) ABSTRACT

Disclosed is a stopping point comprising a connecting eye (1) used with stopping or lashing means. Said connecting eye is rotatably mounted on an anchoring screw (4) which is undetachably connected to a supporting disc (10). The base (2) of the connecting eye leans against a ring flange (13) of the anchoring screw (4) head (5) via a first series of rolling bodies (11) and against the supporting disc (10) via a second series of rolling bodies (12) so as to ensure high rotatability of the connecting eye (1) in relation to the anchoring screw (4).

7 Claims, 1 Drawing Sheet

U.S. PATENT DOCUMENTS

| | | | | |
|---|---|---|---|---|
| 4,705,422 A | * | 11/1987 | Tsui et al. | 403/60 |
| 4,986,712 A | * | 1/1991 | Fultz | 411/428 |
| 5,054,982 A | * | 10/1991 | Freeman | 411/400 |
| 5,125,861 A | * | 6/1992 | Freeman | 411/400 |
| 5,183,360 A | * | 2/1993 | Freeman | 411/400 |
| 5,634,734 A | * | 6/1997 | Schron et al. | 403/78 |
| 5,690,457 A | * | 11/1997 | Smetz | 411/400 |
| 5,743,576 A | * | 4/1998 | Schron et al. | 294/1.1 |
| 5,992,910 A | * | 11/1999 | Kwon | 294/1.1 |
| 6,022,164 A | * | 2/2000 | Tsui et al. | 403/78 |
| 6,349,985 B1 | * | 2/2002 | Aston | 294/1.1 |
| 6,398,447 B1 | * | 6/2002 | Pearl | 403/164 |

FOREIGN PATENT DOCUMENTS

| | | | |
|---|---|---|---|
| DE | 876628 | | 5/1953 |
| DE | 4336779 | | 4/1995 |
| DE | 4336780 A1 | * | 4/1995 |
| DE | 10062971 | | 8/2002 |
| EP | 161652 A2 | * | 11/1985 |
| EP | 0654611 | | 5/1995 |

OTHER PUBLICATIONS

NPL Torrington bearing catalogue "Angular Contact Thrust Ball Bearings Type DTVL".*

* cited by examiner

6,994,501 B2

STOPPING POINT

TECHNICAL FIELD

The invention relates to a point of attachment having a connection eye, into which an attachment or lashing means can be fitted, and an anchoring bolt, which serves for fastening the same on an object and of which the head is provided with an annular flange on which is supported the connection eye, which has a base provided with a bore and is mounted in a rotatable manner on the anchoring bolt.

PRIOR ART

A point of attachment of the abovementioned type which is designed as a so-called ring bolt is known from EP 0654611 B1. In the case of the known point of attachment, a cylindrical section which adjoins the annular flange of the head of the anchoring bolt projects slightly beyond the underside of the base of the connection eye, with the result that the latter can rotate freely about the longitudinal axis of the anchoring bolt. The known solution is distinguished by a simplicity which takes account of the mass-produced nature of points of attachment. As the loads which are to be raised by means of relevant points of attachment increase in weight, it is nevertheless possible, on account of the frictional conditions between the annular flange and the base of the eye, for the automatic alignment of the connection eye in the pulling direction of the attachment means connected to the connection eye in each case to be impaired.

In order to reduce the frictional forces, in the case of a point of attachment which is known from DE 43 36 779 C2, a ball-mounted connection eye is supported in relation to a bushing-like carrier which is retained by an anchoring bolt of standard dimensions. This second known solution is not fully satisfactory because, with it, the distance between the connection eye and the load is comparatively large and, in the case of forces acting more or less obliquely on the connection eye, the tilting resistance of the connection eye leaves something to be desired.

DESCRIPTION OF THE INVENTION

The object of the invention, in the case of a point of attachment of the generic type, is for the rotatability of the connection eye to be ensured even when heavy loads are handled. Attempts are made simultaneously for the connection-eye tilting resistance, which is already high in any case on account of the proximity of the base of the connection eye to the load, to be increased further, in the case of forces being introduced obliquely, by a particularly expedient arrangement and selection of the rolling-contact bearings. This object is achieved according to the invention in that, in the case of a point of attachment of the generic type, a supporting disk is connected in captive fashion to the anchoring bolt, and in that the base of the connection eye is supported, via a first series of rolling-contact bodies, against the annular flange of the head and, via a second series of rolling-contact bodies, against the supporting disk.

It is not just the case that the already indicated disadvantages of the known design described above are eliminated in the case of the point of attachment according to the invention; in addition, the arrangement of the rolling-contact bearings proves to be extremely easy to install since there is no need for the rolling-contact bodies to be supplied by way of special supply channels.

Further advantages and details of the invention can be gathered from the subclaims and from the following description of an embodiment of the invention which is illustrated in the attached drawing.

METHODS OF IMPLEMENTING THE INVENTION

Figures 1, 2:
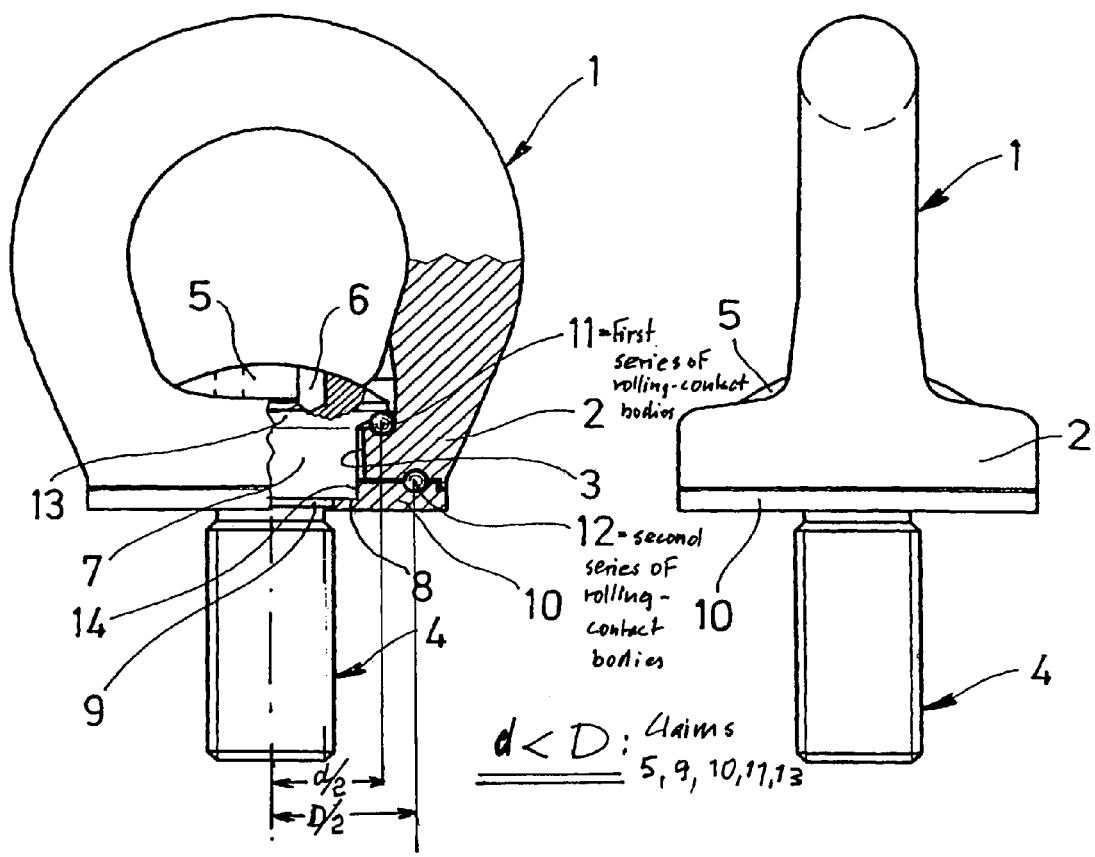
FIG. 1 shows, partly in section, a first view of a point of attachment designed as a ring bolt.
FIG. 2 shows a second view of the point of attachment according to FIG. 1.

In FIG. 1, 1 is the connection eye of a point of attachment designed as a ring bolt. The connection eye 1 has a base 2 which is provided with a bore 3 for accommodating an anchoring bolt 4. The anchoring bolt 4 has a head 5 which is provided with a hexagon socket 6. The head 5 of the anchoring bolt 4 is adjoined by a first cylindrical section 7 which, via a narrow annular collar 8, merges into a second cylindrical section 9, of which the diameter is smaller than the diameter of the first cylindrical section 7. An annular supporting disk 10 is pressed onto the cylindrical section 9 and the bottom end of the cylindrical section 7 and, in the installed state of the point of attachment, is pressed against an abutment surface by the anchoring bolt 4.

In order to ensure a high level of rotatability of the connection eye 1 even in the event of it being subjected to large forces, the point of attachment is provided with two series of rolling-contact bodies 11, 12 which are formed by grooved ball bearings and of which the series of rolling-contact bodies 11 is arranged between an annular flange 13 of the head 5 of the anchoring bolt 4 and the base 2 of the connection eye 1 and the series of rolling-contact bodies 12 is arranged between the underside of the base 2 of the connection eye 1 and the supporting disk 10. It is beneficial for the tilting resistance of the connection eye 1 if the diameter of the guide groove for the series of rolling-contact bodies 12 is larger than the diameter of the guide groove for the series of rolling-contact bodies 11. A stepped bore 14 in the supporting disk 10 forms an additional security against axial displacements between the anchoring bolt 4 and the supporting disk 10.

What is claimed is:
1. A point of attachment having a connection eye, into which means for attaching or lashing can be fitted, and an anchoring bolt adapted to be fastened on an object, said anchoring bolt having a head which is provided with an annular flange on which the connection eye is supported, said connection eye having a base provided with a bore and is mounted in a rotatable manner on the anchoring bolt, characterized in that a supporting disk (10) is connected in captive fashion to the anchoring bolt (4), and in that the base (2) of the connection eye (1) is supported, via a first series of rolling-contact bodies (11), against the annular flange (13) of the head (5) and, via a second series of rolling-contact bodies (12), against the supporting disk (10); and in that said annular flange (13) is adjoined by two cylindrical sections (7, 9), of which the section (7), which is directed toward the annular flange (13), has a larger diameter than the section (9), which is directed toward the thread of the anchoring bolt (4); and in that the supporting disk (10) is provided with a stepped bore (14) that forms an annular collar (8) directed away from the head (5) of the anchoring bolt (4), said collar providing a resting surface for the larger diameter section (7).

2. The point of attachment as claimed in claim 1, characterized in that the diameter of a guide groove for the first series of rolling-contact bodies (11) is smaller than the diameter of a guide groove for the second series of rolling-contact bodies (12).

3. The point of attachment as claimed in claim 1, characterized in that the series of rolling-contact bodies (11, 12) are designed as grooved ball bearings.

4. The point of attachment as claimed in claim 3, characterized in that the diameter of a groove guide for the first series of rolling-contact bodies (11) is smaller than the diameter of a groove guide for the second series of rolling-contact bodies (12).

5. The point of attachment as claimed in claim 1, characterized in that the connection between the anchoring bolt (4) and the supporting disk (10) is designed as a press-fit connection.

6. The point of attachment as claimed in claim 5, characterized in that the series of rolling-contact bodies (11, 12) are designed as grooved ball bearings.

7. The point of attachment as claimed in claim 5, characterized in that the diameter of a groove guide for the first series of rolling-contact bodies (11) is smaller than the diameter of a groove guide for the second series of rolling-contact bodies (12).

* * * * *